W. F. Caswell,
Jaw Trap,
Nº 48,905. Patented July 25, 1865.

Witnesses.
D. R. Hale Jr.
T. A. Brooks

Inventor.
William F. Caswell
by his attorney,
R. M. Eddy

UNITED STATES PATENT OFFICE.

WM. F. CASWELL, OF RAYNHAM, MASSACHUSETTS.

IMPROVEMENT IN ANIMAL-TRAPS.

Specification forming part of Letters Patent No. 48,905, dated July 25, 1865.

*To all whom it may concern:*

Be it known that I, WILLIAM F. CASWELL, of Raynham, of the county of Bristol, of the State of Massachusetts, have invented an Improved Trap for Catching Minks or Various other Animals; and I do hereby declare the same to be fully described in the following specification and represented in the accompanying drawings, of which—

Figure 1:
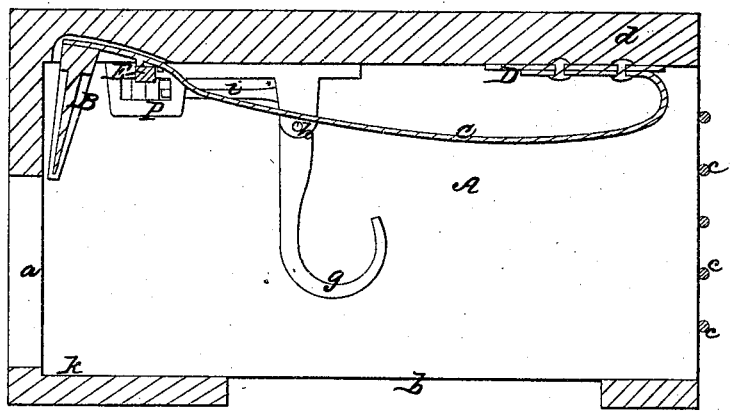
Figure 2:
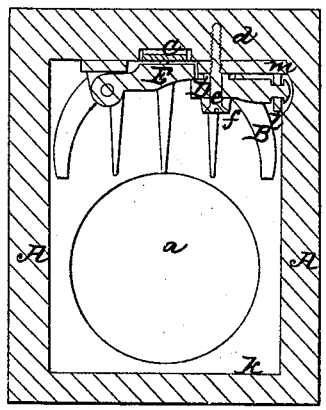
Figure 3:
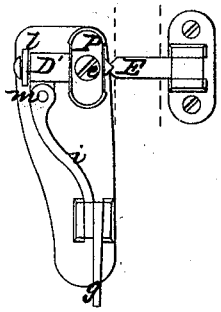

Figure 1 is a longitudinal and vertical section, and Fig. 2 is a transverse section, of the said trap. Fig. 3 is an under-side view of the jaw-tripping mechanism.

A distinctive feature in this trap is that its entrapping-jaw and the mechanism for holding the same set and springing it are entirely inclosed within the case or box of the trap, and thus, as no part thereof projects from the box, there is no danger, when the trap is set, of its being sprung by an animal by walking over or stepping on it, or by stones or other matters placed on the box, or by bushes or falling branches thereof. This construction also admits of all the trap, except its entrance port or opening, being buried within or surrounded by earth after the trap may have been set. As the operative parts of the trap are thus protected by the box, neither the earth, nor snow, nor ice can or will be likely to prevent their correct operation. A trap made in this way is more likely to be attractive to an animal than one whose works are more or less exposed or project from its case.

In the drawings, A denotes a rectangular box or case, made with an entrance port or opening, $a$, at one end, and with a setting-opening, $b$, through its bottom, and also with its other end open and provided with a series of cross-bars, $c\ c\ c$, or their equivalent. In this box is a toothed jaw, B, projecting from the free end of a strong spring, C, whose other end is fastened to a plate, D, which is secured to the top, $d$, of the box. The said jaw is arranged with respect to the entrance-port in manner as shown in Figs. 1 and 2.

Over the spring, and secured to the top of the box by a hinge, is a latch, E, so arranged as to be capable of being turned across the spring when its free end is pressed against the top of the box. This latch has a tripper, D′, for holding it when across the spring, and so as to maintain the spring set or in position when its free end, with the jaw, is pressed up to the top of the box. The said tripper is a lever which turns on a fulcrum, $e$, supported by a suitable frame, $f$, and to its longer arm it has a wheel or roller, $l$, applied by a journal to project from the arm, such wheel being to bear against a rail or a projection, $m$, extending from or making a part of the frame $f$ hereinbefore mentioned. The roller $l$ and the projection $m$ enable the tail or longer arm of the tripper to be arranged so far from the frame $l$ as to prevent frost from stopping the lever or freezing its longer arm to the frame, and, besides, they enable the tripper to be easily moved. Another hooked lever or trigger, $g$, to which the bait is to be fastened, turns on a fulcrum, $h$, supported by the frame $f$, and is connected to the tripper D by a connecting-rod, $i$, which is jointed to both levers, the whole being in such manner that a movement of the trigger-lever may so move the tripper as to discharge it from the latch, and thereby set free the spring and enable it quickly and smartly to depress the jaw. The toothed jaw being driven toward the board $k$, which constitutes a part of the bottom of the box, will entrap an animal when reaching through the entrance-port to seize the bait.

It is through the opening of the bottom of the box of the trap that I am enabled to get at the spring and the mechanism for setting the trap, and, if desirable, there may be a door to such opening.

I claim—

The spring-jaw-setting mechanism, as constructed with the wheel $l$ and the rail or projection $m$, combined and arranged with the tripper D′, the latch E, and the bait-trigger, applied together as set forth.

WILLIAM F. CASWELL.

Witnesses:
R. H. EDDY,
F. P. HALE, Jr.